United States Patent
Suzuki et al.

(10) Patent No.: US 10,855,204 B2
(45) Date of Patent: Dec. 1, 2020

(54) ELECTROSTATIC INDUCTION TYPE POWER GENERATION ELEMENT

(71) Applicant: THE UNIVERSITY OF TOKYO, Tokyo (JP)

(72) Inventors: Yuji Suzuki, Tokyo (JP); Takashi Kato, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 245 days.

(21) Appl. No.: 15/778,056

(22) PCT Filed: Nov. 25, 2016

(86) PCT No.: PCT/JP2016/084970
§ 371 (c)(1),
(2) Date: Oct. 2, 2018

(87) PCT Pub. No.: WO2017/090727
PCT Pub. Date: Jun. 1, 2017

(65) Prior Publication Data
US 2019/0020287 A1    Jan. 17, 2019

(30) Foreign Application Priority Data
Nov. 25, 2015  (JP) .................................. 2015-229877

(51) Int. Cl.
*H02N 1/00* (2006.01)
*H02N 1/08* (2006.01)

(52) U.S. Cl.
CPC ............... *H02N 1/002* (2013.01); *H02N 1/08* (2013.01)

(58) Field of Classification Search
CPC ................................ H02N 1/002; H02N 1/08
(Continued)

(56) References Cited

U.S. PATENT DOCUMENTS

2004/0169627 A1    9/2004  Hong
2012/0181897 A1*   7/2012  Masaki ................... H02N 1/08
                                                              310/309
(Continued)

FOREIGN PATENT DOCUMENTS

JP    2004-199065 A    7/2004
JP    2005-229707 A    8/2005
(Continued)

OTHER PUBLICATIONS

Feb. 14, 2017 International Search Report issued in International Patent Application No. PCT/JP2016/084970.
(Continued)

*Primary Examiner* — Forrest M Phillips
(74) *Attorney, Agent, or Firm* — Oliff PLC

(57) ABSTRACT

An electrostatic induction type power generation element is capable of increasing the amount of generated power while suppressing a parasitic capacitance between electrodes between which induced electromotive force is generated. An electrostatic induction type power generation element in one embodiment includes: substrates which are opposed to each other and which move relative to each other in a direction parallel to the opposing surfaces of the substrates; a charge retaining unit and conductors which are respectively formed on the opposing surfaces of the substrates; and a substance which is interposed between the substrates opposed to each other and between the charge retaining unit and the conductors, and which has an anisotropic dielectric constant in which a relative dielectric constant in the direction parallel to the opposing surfaces is higher than a relative dielectric constant in a direction orthogonal to the opposing surfaces.

5 Claims, 3 Drawing Sheets

(58) Field of Classification Search
USPC .......................................................... 310/309
See application file for complete search history.

(56) References Cited

U.S. PATENT DOCUMENTS

| | | | | |
|---|---|---|---|---|
| 2013/0106317 A1* | 5/2013 | Ludois | ..................... | H02N 1/00 |
| | | | | 318/116 |
| 2015/0236619 A1* | 8/2015 | Hattori | ..................... | H02N 1/08 |
| | | | | 310/309 |
| 2015/0295519 A1* | 10/2015 | Viala | ........................ | H02N 2/18 |
| | | | | 310/319 |
| 2015/0320295 A1* | 11/2015 | Belson | ................... | A61B 34/30 |
| | | | | 600/141 |
| 2015/0333661 A1* | 11/2015 | Ikuta | ........................ | H02N 1/10 |
| | | | | 310/300 |
| 2016/0118912 A1* | 4/2016 | Hayashi | ................ | B81C 99/002 |
| | | | | 310/309 |

FOREIGN PATENT DOCUMENTS

| | | | |
|---|---|---|---|
| JP | 2007-312551 A | 11/2007 | |
| JP | 2011-045194 A | 3/2011 | |
| JP | 2015-164379 A | 9/2015 | |
| WO | 2006/068727 A2 | 6/2006 | |
| WO | WO-2006068727 A2 * | 6/2006 | ........... H02N 11/002 |

OTHER PUBLICATIONS

May 29, 2018 International Preliminary Report on Patentability issued in International Patent Application No. PCT/JP2016/084970.
Sep. 11, 2019 Search Report issued in European Patent Application No. 16868670.7.

* cited by examiner

[FIG. 1]
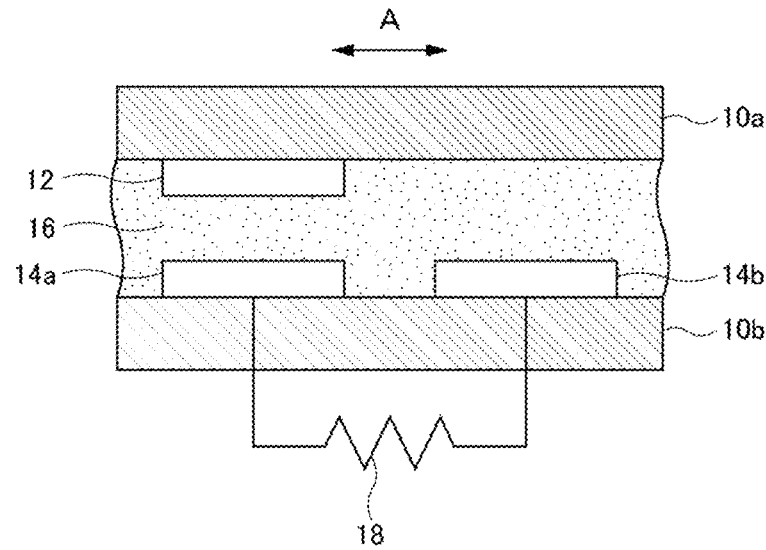
[FIG. 2]
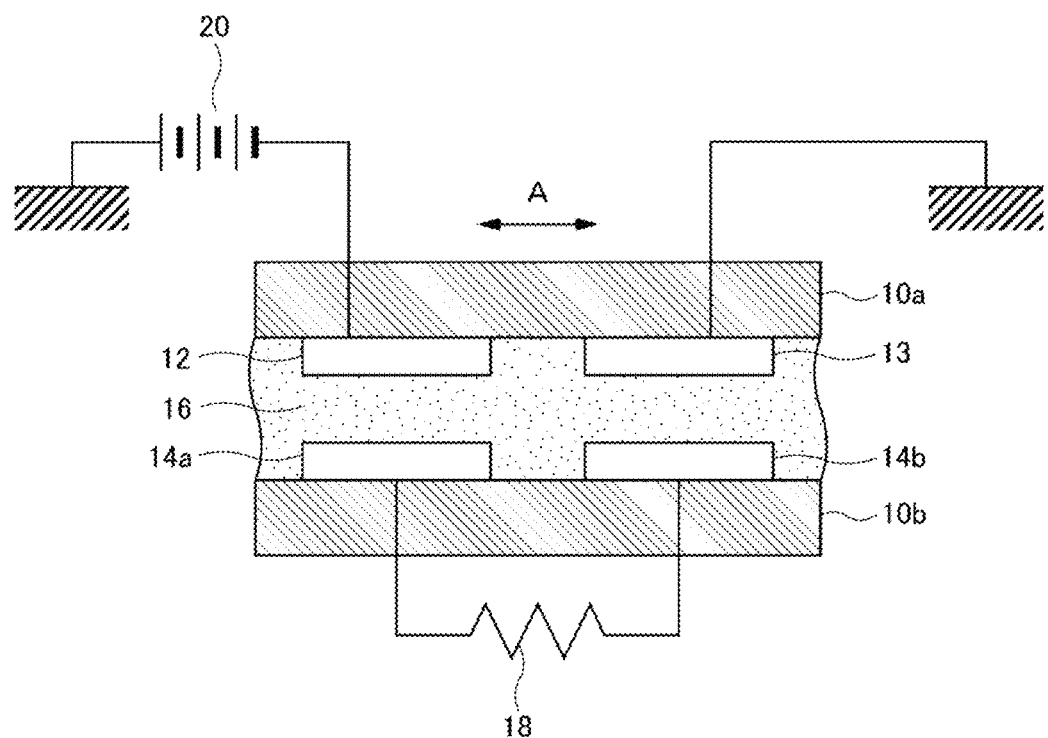

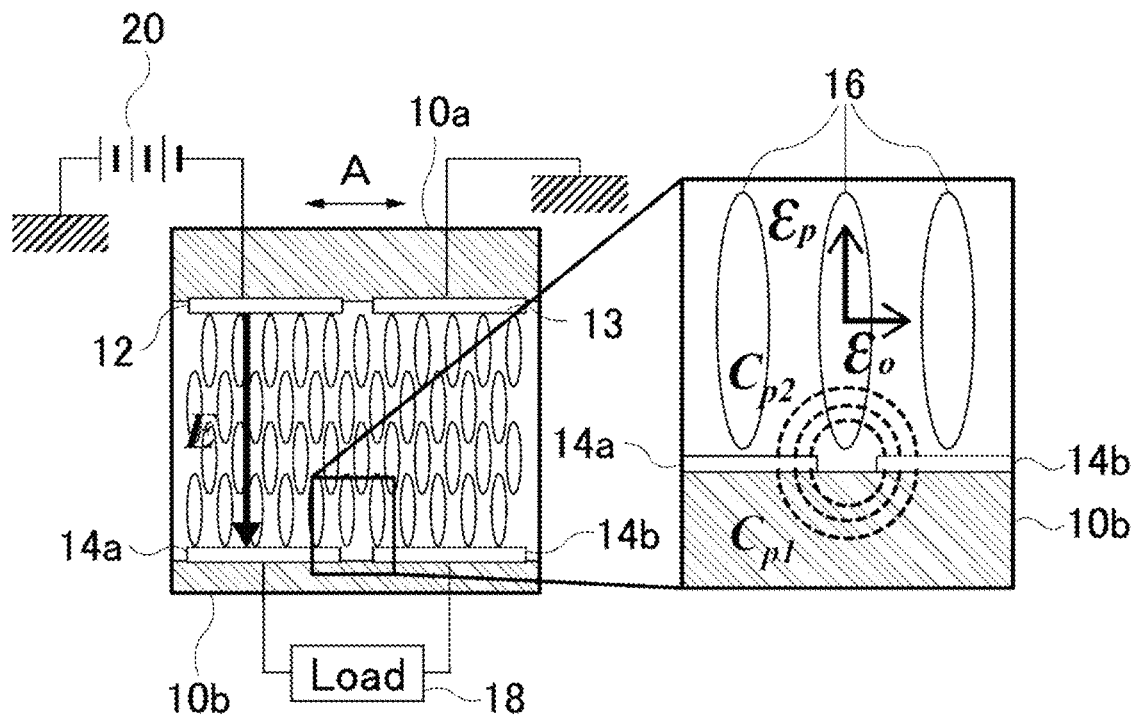
Fig. 3A  Fig. 3B
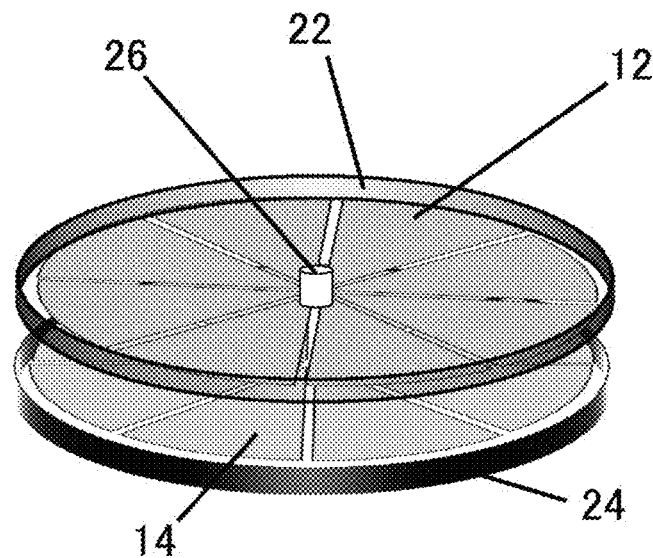
[FIG. 4]

[FIG. 5]
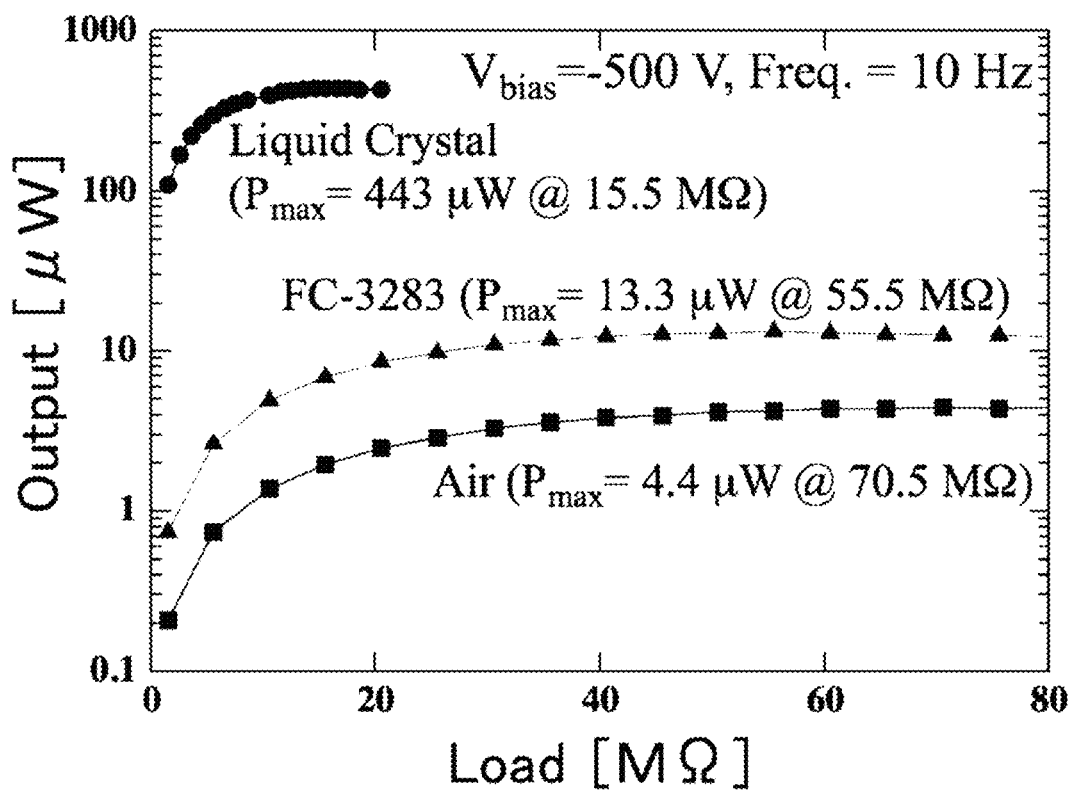

ELECTROSTATIC INDUCTION TYPE POWER GENERATION ELEMENT

TECHNICAL FIELD

The present disclosure relates to an electrostatic induction type power generation element.

BACKGROUND ART

Conventionally, there has been proposed an electrostatic induction type power generation element using an electret prepared by injecting charges to an insulation material. Such an electrostatic induction type power generation element using an electret is known to have a high conversion efficiency between the electric energy and the kinetic energy. For example, Patent Documents 1 and 2 mentioned below each discloses an electrostatic induction type power generation element using an electret.

Also, the electrostatic induction type power generation element can be realized by applying a voltage to one of opposing electrodes, and relatively moving the electrodes.

As mentioned above, in an electrostatic induction type power generation element, an amount of generated power (induced electromotive force) can be increased by providing a dielectric body between the electrodes to increase a relative dielectric constant.

PRIOR ARTS

Patent Document

Patent Document 1: Japanese Unexamined Patent Publication (Kokai) No. 2005-229707
Patent Document 2: Japanese Unexamined Patent Publication (Kokai) No. 2007-312551

SUMMARY

However, there is a problem that when a relative dielectric constant between electrodes is increased, a parasitic capacitance between the electrodes where the induced electromotive force is generated (electrodes facing to the electret) is also increased, and as a result, the power generation loss is increased, and a sufficient amount of generated power cannot be obtained.

One of the objectives of the present disclosure is to provide an electrostatic induction type power generation element capable of suppressing the parasitic capacitance between the electrodes where the induced electromotive force is generated, and increasing the amount of generated power.

In order to attain the above objective, an aspect of the present disclosure is an electrostatic induction type power generation element which coverts kinetic energy to electric energy, and comprises: substrates which are opposed to each other, and relatively move in the direction parallel to the opposing surfaces, a charge retaining unit and a conductor which are respectively formed on the opposing surfaces of the substrates, and a substance provided between the opposing substrates and between the charge retaining unit and the conductor, the substance having an anisotropic dielectric constant so that a relative dielectric constant in the direction orthogonal to the opposing surfaces is larger than a relative dielectric constant in the direction parallel to the opposing surfaces.

Here, preferably, the substance having an anisotropic dielectric constant is liquid crystal.

Also, preferably, the charge retaining unit is an electret or an electrode connected to a power source.

Effect of Disclosure

According to the present disclosure, an electrostatic induction type power generation element capable of suppressing the parasitic capacitance between the electrodes where the induced electromotive force is generated, and capable of increasing the amount of generated power, can be obtained.

BRIEF DESCRIPTION OF DRAWINGS

FIG. 1 is a sectional view of a constitutional example of an electrostatic induction type power generation element according to an aspect.

FIG. 2 is a sectional view of a modified example of an electrostatic induction type power generation element according to an aspect.

FIGS. 3(a) and 3(b) are schematic views showing the case that anisotropic dielectric bodies are provided between substrates in an electrostatic induction type power generation element according to an aspect.

FIG. 4 is a perspective view of another modified example of an electrostatic induction type power generation element according to an aspect.

FIG. 5 shows measurement results of the change of the electric power which can be extracted to the outside from the electrostatic induction type power generation element, when the dielectric body provided between the substrates is changed.

ASPECT OF DISCLOSURE

Hereinbelow, an aspect of the present disclosure (hereinbelow, referred to as an aspect) will be explained, with reference to the drawings.

FIG. 1 shows a sectional view of a constitutional example of an electrostatic induction type power generation element according to an aspect. In FIG. 1, an electrostatic induction type power generation element is provided with substrates 10a, 10b, which are opposed to each other, and relatively move in a direction parallel to the opposing surfaces. A charge retaining unit 12 is provided on the opposing surface of the substrate 10a, and conductors 14a, 14b are provided on the opposing surface of the substrate 10b. The relative movement of the substrates 10a, 10b can be realized by, for example, oscillating the substrate 10a in the direction of the arrow A in FIG. 1. Further, the substrates 10a, 10b may be moved in parallel with the opposing surfaces (in the arrow-A direction), but in different directions, at the same time, so that the substrates oscillate relatively.

The charge retaining unit 12 has a charge retaining function, and may be constituted by, for example, an electret. The electret is formed by injecting charges (for example, negative charges) around a surface of an insulation material, such as a resin. Injection to the insulation material may be performed by a known method such as liquid-contact, corona discharge, electron beam, back-lighted thyratron, and the like. In the example shown in FIG. 1, the charge retaining unit 12 has a plate-like shape, but it can be formed in any shape as far as an electric field can be formed between the charge retaining unit 12 and the conductors 14a, 14b.

Further, in response to the relative movement of the substrates 10a, 10b, due to the charges retained by the charge retaining unit 12, an induced electromotive force is generated on the conductors 14a, 14b by electrostatic induction.

In general, a theoretical output P (amount of generated power) of the electrostatic induction type power generation element may be represented by the following formula.

[Mathematical Formula 1]

$$P = \frac{\sigma^2 \cdot A_0 f}{4\frac{\varepsilon_2 \varepsilon_0}{d}\left(\frac{\varepsilon_2 g}{\varepsilon_1 d} + 1\right)} = \frac{\varepsilon_0 V_s^2 \cdot A_0 f}{4\left(\frac{g}{\varepsilon_1} + \frac{d}{\varepsilon_2}\right)} \quad (1)$$

In the formula, $\sigma$ represents a surface charge density of the charge retaining unit 12 (electret), Vs represents a surface potential of the charge retaining unit 12, d represents a thickness of the charge retaining unit 12, $\varepsilon_2$ represents a relative dielectric constant of the charge retaining unit 12, g represents a distance between the charge retaining unit 12 and the conductors 14a, 14b, $\varepsilon_1$ represents a relative dielectric constant in a gap between the charge retaining unit 12 and the conductors 14a, 14b, $A_0$ represents an area of the charge retaining unit 12, and f represents a frequency of the reciprocal movement (oscillation) of the charge retaining unit 12. In addition, $\varepsilon_0$ represents a dielectric constant in the vacuum.

In order that efficient electrostatic induction (power generation) occurs on the conductors 14a, 14b, the distance g (the distance in the direction orthogonal to the opposing surfaces of the substrates 10a, 10b) between the charge retaining unit 12 and the conductors 14a, 14b is preferably 100 µm or less. The induced electromotive force generated at the conductors 14a, 14b can be extracted to the outside by the load 18 as electric power.

As can be understood from the above formula (1), if the relative dielectric constant $\varepsilon_1$ is increased, i.e., if a dielectric body having a high relative dielectric constant is placed in the gap between the charge retaining unit 12 and the conductors 14a, 14b, the amount of generated power P is increased, and thus, the electric power which can be extracted to the outside by the load 18, can be also increased.

However, there is a parasitic capacitance between the conductors 14a and 14b. Due to the parasitic capacitance, a part of the electric power which can be theoretically extracted from the load 18 is consumed by the parasitic capacitance, and the power generation efficiency is decreased (the electric power which can be extracted to the outside is decreased). If the dielectric body is placed in the gap between the charge retaining unit 12 and the conductors 14a, 14b, the parasitic capacitance is also increased. Namely, although the amount of generated power P is increased, the electric power consumed by the parasitic capacitance is also increased, and thus, the electric power which can be extracted to the outside cannot be sufficiently increased.

Therefore, in the electrostatic induction type power generation element according to the present aspect, a substance having an anisotropic dielectric constant which has a larger relative dielectric constant in the direction orthogonal to the opposing surfaces than a relative dielectric constant in the direction parallel to the opposing surfaces (hereinbelow, referred to as an anisotropic dielectric body) 16, is provided between the opposing substrates 10a and 10b. Here, "between the substrates 10a and 10b" refers to a region between the opposing substrates 10a and 10b, and a region between the charge retaining unit 12 and the conductors 14a, 14b.

The use of the anisotropic dielectric body 16 results in increasing the relative dielectric constant $\varepsilon_1$ in the gap between the charge retaining unit 12 and the conductors 14a, 14b and in the direction orthogonal to the opposing surfaces (hereinafter, may be referred to as $\varepsilon_P$), and suppressing the increase of the parasitic capacitance between the conductors 14a and 14b to be relatively lower than the increase of the above relative dielectric constant $\varepsilon_1$. This is because the relative dielectric constant in the direction parallel to the opposing surfaces (hereinafter, may be referred to as $\varepsilon_O$) is smaller than the relative dielectric constant $\varepsilon_P$. Thereby, the increase of electric power consumed by the parasitic capacitance can be suppressed to be lower than the increase of the induced electromotive force between the charge retaining unit 12 and the conductors 14a, 14b, and as a result, the electric power which can be extracted to the outside from the electrostatic induction type power generation element according to the present aspect, can be increased.

The anisotropic dielectric body 16 may be any substance as far as the substance has anisotropy in relative dielectric constant. Examples of such substance may include nematic liquid crystal, smectic liquid crystal, columnar liquid crystal, and the like.

In the example of FIG. 1, the substrate 10a is provided with one charge retaining unit 12, and the substrate 10b is provided with two conductors 14a, 14b. However, a combination of the numbers of the charge retaining unit and the conductor formed on the substrates 10a, 10b is not limited to that of the example shown in FIG. 1, and can be any combination of the numbers as far as the induced electromotive force is generated on the conductor.

FIG. 2 shows a sectional view of a modified example of an electrostatic induction type power generation element according to an aspect. Same numerals are assigned to the same elements shown in FIG. 1. FIG. 2 is different from FIG. 1 in the point that the charge retaining unit 12 is not made of an electret, but is made of a conductor, such as a metal plate, etc., with a voltage applied from a power source 20. Further, the substrate 10a is also provided with a GND electrode 13 which is grounded and is arranged adjacent to the charge retaining unit 12. Instead of providing the GND electrode 13, the substrate 10 may have no electrode adjacent to the charge retaining unit 12, as in FIG. 1. Also in the structure shown in FIG. 2, in response to the relative movement of the substrates 10a, 10b, due to the charges retained by the charge retaining unit 12, electrostatic induction occurs between the conductors 14a and 14b, and an induced electromotive force is generated on the conductors 14a, 14b.

Further, in the example of FIG. 2, the substrate 10a is provided with one charge retaining unit 12, and the substrate 10b is provided with two conductors 14a, 14b, too. However, a combination of the numbers of the charge retaining unit and the conductor formed on the substrates 10a, 10b is not limited to that of the example shown in FIG. 2, and can be any combination of the numbers as far as the induced electromotive force is generated on the conductor.

FIG. 3(a) and FIG. 3(b) are schematic views showing the case that anisotropic dielectric bodies 16 are provided between the substrates 10a and 10b in an electrostatic induction type power generation element according to an aspect. FIG. 3(a) is a sectional view of the electrostatic induction type power generation element in which the anisotropic dielectric bodies 16 are arranged, and FIG. 3(b) is an enlarged partial view of FIG. 3(a). In the example of FIG. 3(a) and FIG. 3(b), the electrostatic induction type power generation element having the structure shown in FIG. 2 is used for explanation. However, similar explanation is also possible for the electrostatic induction type power generation element having the structure shown in FIG. 1.

In FIG. 3(a), a voltage is applied from the power source 20 so that the charge retaining unit 12 retains charges. When, due to the charges, an electric field E is generated between the charge retaining unit 12 and the conductors 14a, 14b, anisotropic dielectric bodies 16 constituted by nematic liquid crystal, etc., are aligned in the direction of the electric field E. Aligning in the direction of the electric field E refers to, as shown in FIG. 3(a), the major axis of the liquid crystal is oriented in the direction of the electric field E, i.e., the direction orthogonal to the opposing surfaces of the substrates 10a, 10b.

As shown in FIG. 3(b), the nematic liquid crystal, etc., constituting the anisotropic dielectric body 16 has a relative dielectric constant $\varepsilon_P$ ($\varepsilon_1$ in formula (1)) in the major axis direction of the liquid crystal which is larger than a relative dielectric constant $\varepsilon_O$ in the minor axis direction of the liquid crystal. In FIG. 3(b), the length of an arrow representing $\varepsilon_P$ is longer than the length of an arrow representing $\varepsilon_O$, in order to indicate $\varepsilon_P > \varepsilon_O$.

Further, FIG. 3(b) shows a parasitic capacitance between the conductors 14a and 14b. The parasitic capacitance generated in the substrate 10b is represented by $Cp_1$, and the parasitic capacitance generated in the space between the charge retaining unit 12 and the conductors 14a, 14b (space located on the opposite side of the substrate 10b with the conductors 14a, 14b therebetween) is represented by $Cp_2$.

As mentioned above, the liquid crystal constituting the anisotropic dielectric body 16 is aligned so that the major axis direction thereof is in the direction of the electric field E. Therefore, as far as the charge retaining unit 12 retains the charges, the anisotropic dielectric body 16 is aligned so that the major axis direction of the liquid crystal is in the direction orthogonal to the opposing surfaces of the substrates 10a, 10b, and thereby, the relative dielectric constant ($\varepsilon_P$) in the direction orthogonal to the opposing surfaces becomes larger than the relative dielectric constant ($\varepsilon_O$) in the direction parallel to the opposing surfaces.

Accordingly, the anisotropic dielectric body 16 has a larger relative dielectric constant in the direction orthogonal to the opposing surfaces than that in the direction parallel to the opposing surfaces. Thereby, among the parasitic capacitances between the conductors 14a and 14b, the parasitic capacitance $Cp_2$ in the space between the charge retaining unit 12 and the conductors 14a, 14b can be suppressed from increasing. As a result, in the gap between the charge retaining unit 12 and the conductors 14a, 14b, the relative dielectric constant in the direction orthogonal to the opposing surfaces corresponding to the relative dielectric constant $\varepsilon_P$ of the liquid crystal in the major axis direction, is larger than the relative dielectric constant in the direction parallel to the opposing surfaces corresponding to the relative dielectric constant $\varepsilon_O$ of the liquid crystal in the minor axis direction, and the increase of the parasitic capacitance $Cp_2$ can be suppressed. Thus, the amount of electric power which can be extracted to the outside when the substrate 10a oscillates in the arrow A direction, can be increased.

FIG. 4 shows a perspective view of another modified example of an electrostatic induction type power generation element according to an aspect. Same numerals are assigned to the same elements shown in FIG. 1. In FIG. 4, the rotor 22 and the stator 24 are opposed with each other, the opposing surface of the rotor 22 is provided with a plurality of radially arranged charge retaining units 12 constituted by electrets, and the opposing surface of the stator 24 is provided with a plurality of radially arranged conductors 14. The rotor 22 rotates around the rotation axis 26. The plurality of charge retaining units 12 and conductors 14 are radially arranged with the rotation axis 26 at the center. As a result, when the rotor 22 rotates, the charge retaining units 12 and the conductors 14 relatively move, and an induced electromotive force is generated on the conductor 14 by the electrostatic induction. The generated electric power may be extracted to the outside by a load (not shown).

FIG. 5 shows measurement results of the change of the electric power which can be extracted to the outside from the electrostatic induction type power generation element, when the dielectric body provided between the substrates 10a and 10b is changed. In FIG. 5, the horizontal axis indicates a resistance value of the load 18, and the vertical axis indicates an output electric power value extracted from the load 18. The measurements shown in FIG. 5 were performed using the electrostatic induction type power generation element shown in FIG. 2 or FIG. 3, under the conditions that the voltage applied from the power source 20 to the charge retaining unit 12 was −500V, and that the oscillation frequency of the substrate 10a (charge retaining unit 12) was 10 Hz.

The charge retaining unit 12 and the conductors 14a, 14b, which were formed to have a plate-like shape, had opposing surfaces each having a size of 2 cm×2 cm, the charge retaining unit 12 and the conductors 14a, 14b each had a width of 0.5 mm in a direction orthogonal to the arrow A direction shown in FIG. 2 or FIG. 3, the pitch between the charge retaining unit 12 and the GND electrode 13 and the pitch between the conductors 14a and 14b were 1 mm, respectively, the gap (space) between the opposing surfaces of the charge retaining unit 12 and the conductors 14a, 14b was 0.1 mm, and the amplitude of the substrate 10a in the arrow A direction was 1 mm.

As shown in FIG. 5, when the dielectric body was air (shown as Air in FIG. 5), the maximum value Pmax of the output electric power was 4.4 μW with a load resistance of 70.5 MΩ. Further, when the relative dielectric constant of the dielectric body was not anisotropic (was isotropic), i.e., when the dielectric body was Fuorinert™ Electronic Liquid FC-3283 (manufactured by 3M Japan Limited) (shown as FC-3283 in FIG. 5), Pmax was 13.3 μW with a load resistance of 55.5 MΩ. Although this Pmax was higher than the Pmax in the case of air, the degree of increase regarding the output electric power was not large.

On the contrary, when the dielectric body was an anisotropic dielectric body 16 having an anisotropic relative dielectric constant, i.e., nematic liquid crystal 5CB (shown as Liquid Crystal in FIG. 5), the Pmax was increased to 443 μW with a load resistance of 15.5 MΩ. Accordingly, when the anisotropic dielectric body 16 is used as a dielectric body provided between the substrates 10a and 10b, the amount of electric power which can be extracted to the outside from the electrostatic induction type power generation element can be largely increased.

EXPLANATION ON NUMERALS 10a, 10b substrate
12 charge retaining unit
13 GND electrode
14, 14a, 14b conductor 16 anisotropic dielectric body
18 load
20 power source
22 rotor
24 stator
26 rotation axis

The invention claimed is:

1. An electrostatic induction type power generation element that coverts kinetic energy to electric energy, the electrostatic induction type power generation element comprising:
   at least two substrates each having surfaces that are opposed to each other, the at least two substrates being configured to move in a direction parallel to the opposing surfaces of the at least two substrates,
   a charge retaining unit and a conductor which are respectively formed on the opposing surfaces of the at least two substrates, the charge retaining unit and the conductor being separated by a gap, and
   a substance provided between the opposing substrates of the at least two substrates and between the charge retaining unit and the conductor, the substance having an anisotropic dielectric constant such that: (a) a relative dielectric constant in the direction orthogonal to the opposing surfaces is larger than a relative dielectric constant in the direction parallel to the opposing surfaces, and (b) an increase of electric power consumed by parasitic capacitance is suppressed to be lower than an increase of induced electromotive force in the gap between the charge retaining unit and the conductor.

2. An electrostatic induction type power generation element according to claim 1, wherein the substance having the anisotropic dielectric constant is liquid crystal.

3. The electrostatic induction type power generation element according to claim 1, wherein the charge retaining unit is an electret.

4. The electrostatic induction type power generation element according to claim 1, wherein the charge retaining unit is an electrode connected to a power source.

5. The electrostatic induction type power generation element according to claim 2, wherein an orientation of the liquid crystal is not time-varying.

* * * * *